US007218269B2

(12) United States Patent
Gottscheber

(10) Patent No.: US 7,218,269 B2
(45) Date of Patent: May 15, 2007

(54) METHOD FOR ENLARGING THE INTERFERENCE-FREE DYNAMIC RANGE OF NON-LINEAR SIGNAL PROCESSING COMPONENTS

(75) Inventor: Holger Gottscheber, Dornstadt (DE)

(73) Assignee: EADS Deutschland GmbH, Ottobrunn (DE)

( * ) Notice: Subject to any disclaimer, the term of this patent is extended or adjusted under 35 U.S.C. 154(b) by 580 days.

(21) Appl. No.: 10/830,776

(22) Filed: Apr. 23, 2004

(65) Prior Publication Data

US 2004/0263384 A1 Dec. 30, 2004

(30) Foreign Application Priority Data

Apr. 25, 2003 (DE) ............... 103 18 754

(51) Int. Cl.
*H04B 1/10* (2006.01)
(52) U.S. Cl. ........................ 342/93; 342/203
(58) Field of Classification Search ............... 342/93, 342/203, 192, 199
See application file for complete search history.

(56) References Cited

U.S. PATENT DOCUMENTS

2004/0263384 A1* 12/2004 Gottscheber ............... 342/203

FOREIGN PATENT DOCUMENTS

EP 1471651 A2 * 10/2004

OTHER PUBLICATIONS

"A Mathematical Model for the Evaluation of Spurious Response Interference in a Superheterodyne Receiver", European Transactions on Telecommunications and Related Technologies May/Jun. 1990, No. 3, Milano, IT (pp. 265-276) by DeFranco, G.
"Application of Nomographs For Analysis and Prediction of Receiver Spurious Response EMI", by Frederick W. Heather, Naval Air Test Center, Patuxent River, Maryland (pp. 390-398) New York, IEEE, Aug. 1985.

* cited by examiner

*Primary Examiner*—Dan Pihulic
(74) *Attorney, Agent, or Firm*—Collard & Roe, P.C.

(57) ABSTRACT

A method for enlarging the interference-free dynamic range of non-linear signal-processing components in receiver systems, in the conversion of input frequencies $f_{in}$ into output frequencies $f_{out}$. According to the invention, at least one linear combination of at least one input frequency $f_{in,t}$, $f_{in,b}$ and a fixed, predetermined oscillator $f_{LOn}$ of the components is calculated from the output signal of the component, for at least one output frequency $f_{out,s}$, $f_{out1,s}$, $f_{outs,2}$, which combination is compared with any desired output frequency $f_{out,t}$ of the component, whereby the output frequency $f_{out,s}$, $f_{out1,s}$, $f_{outs,2}$ is then recognized as a spur and eliminated from the output signal of the component, if the calculated linear combination corresponds to any desired output frequency $f_{out,t}$ of the component, within a frequency and power range that can be predetermined.

7 Claims, 1 Drawing Sheet

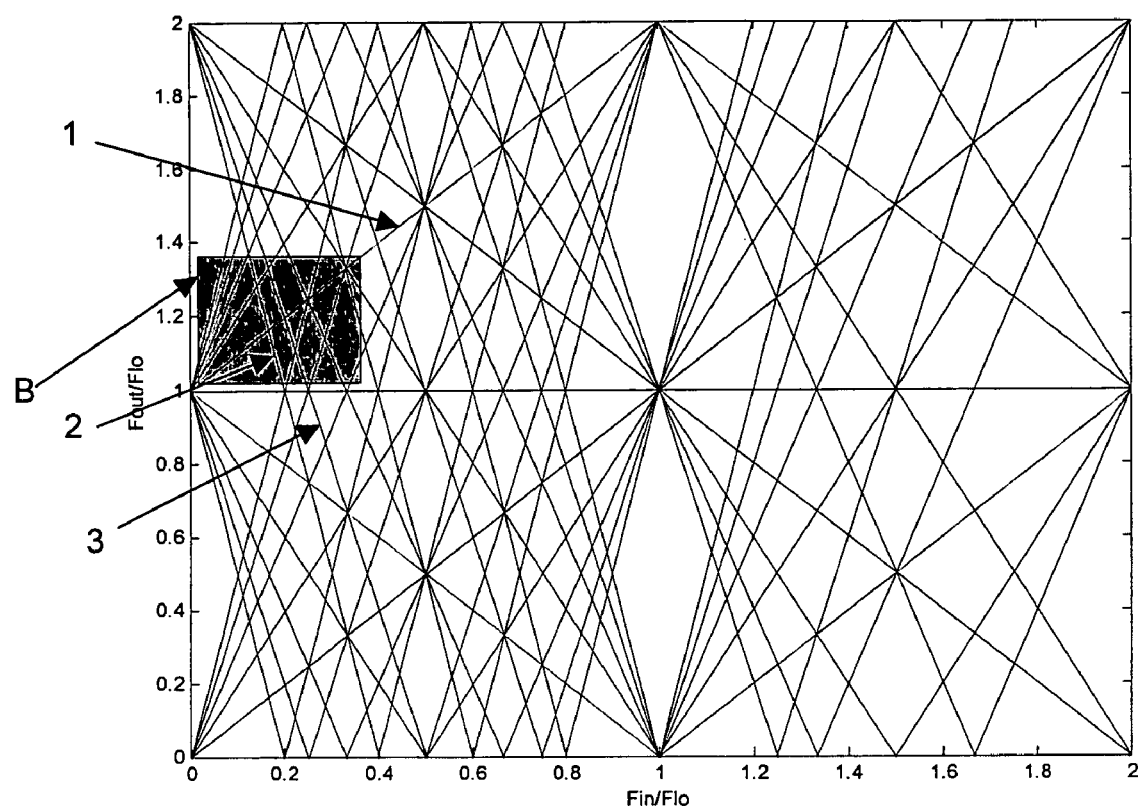

METHOD FOR ENLARGING THE INTERFERENCE-FREE DYNAMIC RANGE OF NON-LINEAR SIGNAL PROCESSING COMPONENTS

BACKGROUND OF THE INVENTION

1. Field of the Invention

The invention relates to a method for enlarging the interference-free dynamic range of non-linear signal-processing components.

2. The Prior Art

With signal processing of reception signals of radar systems, for example, non-linear components, such as amplifiers, mixers, or A/D converters in reception systems, cause unwanted signals, so-called spurs. Suitably selected intermediate or oscillator frequencies do not sufficiently prevent the production of these artificial signals (spurs). The interference-free dynamic range, also called SFDR-spurious-free dynamic range—is reduced by the spurs that are produced. This has a disadvantageous effect on the false alarm rate. Other disadvantages result from the reduced ability to recognize actual targets.

SUMMARY OF THE INVENTION

It is therefore the object of the invention to provide method with which it is possible to remove the signals artificially produced in signal processing (spurs), in order to enlarge the interference-free dynamic range.

This object is accomplished by the invention, in which at least one linear combination of at least one input frequency $f_{in,t}$, $f_{in,b}$ and a fixed, predetermined oscillator $f_{LOn}$ of the components is calculated from the output signal of the component, for at least one output frequency $f_{out,s}$, $f_{out1,s}$, $f_{outs,2}$, which combination is compared with any desired output frequency $f_{out,t}$ of the component, whereby the output frequency $f_{out,s}$ is then recognized as a spur and eliminated from the output signal of the component, if the calculated linear combination corresponds to any desired output frequency $f_{out,t}$ of the component, within a frequency and power range that can be predetermined.

The linear combinations can advantageously be linear combinations of mixer harmonics. In another advantageous embodiment of the invention, the linear combinations can also be linear combinations of intermodulations. Of course, the method according to the invention can also be carried out using both types of combinations. For example, the output frequency $f_{out,s}$, $f_{out1,s}$, $f_{outs,2}$ of a component can first be checked for agreement with a linear combination of mixer harmonics, and then for agreement with a linear combination of intermodulations, or vice versa. The output frequency $f_{out,s}$, $f_{out1,s}$, $f_{outs,2}$ is, in particular, any desired output frequency of the component. It is practical if the method according to the invention is carried out for every output frequency $f_{out,s}$, $f_{out1,s}$, $f_{outs,2}$.

Mixer combinations are formed, for example, in the conversion of a signal in a mixer. In this connection, the frequency $f_{in}$ of an input signal is converted into a new frequency $f_{out}$, according to $f_{out}=|A \cdot f_{in}+B \cdot f_{LO}|$.

In this connection, $f_{LO}$ is the oscillator frequency of the mixer, and $A, B \in Z$ are mixing parameters that can be predetermined. In the case of a usual mixing process, the following applies: $|A|=|B|=1$. Other parameter values usually result in attenuated output signals. The power loss $\Delta P$ caused by the attenuation can be calculated and, in this connection, is particularly dependent on the power of the mixer oscillator, the input power of the input signal, and the parameters A and B. If the power of the mixer oscillator is predetermined, and the power of the input signal is predetermined, the power loss $\Delta P$ can be determined as a function of the parameters A and B.

Intermodulations are formed when two signals are mixed. In this connection, the frequencies $f_{in1}$ and $f_{in2}$ of an input signal are converted to a new frequency $f_{out}$, according to $f_{out}=|A \cdot f_{in1}+B \cdot f_{in2}|$.

In this connection, the method according to the invention proceeds as follows, for the case of a linear combination of mixer harmonics. Any desired frequency $f_{out,e}$ is selected from the output signal and assumed to be the causing frequency. It is advantageous if the selection of the output frequency $f_{out,s}$ is made as a function of the related power, whereby the output frequencies $f_{out,s}$ to be checked are first sorted according to their power. Subsequently, it is advantageous if the original input frequency $f_{in,b}$ ahead of the signal processing in the component is calculated according to the general formula $$f_{in,b} = \left| A \cdot f_{out,s} + \sum_{n=1}^{N} B_n f_{LOn} \right|.$$

In this connection, $f_{LOn}$ refers to the oscillator frequency of the $n^{th}$ stage of the N-stage component. The value of the parameters A and $B_n$, in each instance, is +1 or −1, as described above.

In the next step, linear combinations of the output frequency $f_{zout,s}$ are calculated. For this, linear combinations are calculated for combinations of parameter pairs A and $B_n$ that can be predetermined, with A, $B_n \in Z$, whereby the value range of A and $B_n$ can be predetermined in each instance, according to $$f_{out,s}^z = \left| A \cdot f_{in,b} + \sum_{n=1}^{N} B_n \cdot f_{LOn} \right|$$

with

A, $B_n$: parameters that can be predetermined, with A, $B_n \in Z$,
$f_{in,b}$: input frequency ahead of the component,
$f_{LOn}$: oscillator frequency of the $n^{th}$ stage of the non-linear component,
N: number of stages,
z: running variable of the calculated linear combination.

The value pairs of the parameters A, $B_n$ can be permanently stored in a memory, for example. The following table shows examples of some value pairs of the parameters A, B.

The value pairs indicated can be combined as desired for any stage. In addition, the table shows the signal attenuation $\Delta P$ of an output signal calculated for a single-stage component having the parameters A and B, in each instance.

| A | B | $\Delta P$ in dB |
|---|---|---|
| 1 | 1 | 0 |
| 2 | 1 | $\Delta P$-41 |
| 3 | 1 | 2 $\Delta P$-28 |
| 1 | 2 | −35 |
| 2 | 2 | $\Delta P$-39 |

-continued

| A | B | ΔP in dB |
|---|---|----------|
| 3 | 2 | 2 ΔP-44 |
| 1 | 3 | −10 |
| 2 | 3 | ΔP-32 |

In this connection, ΔP is calculated according to ΔP= $P_{in} - P_{LO}$, with
$P_{in}$ power of the input signal
$P_{LO}$ power of the oscillator frequency $f_{LO}$ of the non-linear component.

Of course, other combinations of the parameters A and B can also be used. An overview of the possible combinations is found in [2], for example.

In a next step, a check is made as to whether an output signal $f_{zout,s}$ calculated by means of linear combination corresponds to an actual output signal $f_{out,t}$ of the component, within a frequency range and power range that can be predetermined. If this case applies, then the output frequency $f_{out,s}$ selected from the output signal and assumed to be a spur is actually a causing frequency (spur) and is eliminated from the output signal.

This check is carried out, in particular, for all the predetermined value pairs A, $B_n$, and all the actual output frequencies $f_{out,t}$ in the output signal of the component.

For the exemplary case of a check of the $M^{th}$ stage of an N-stage non-linear component with linear combinations of intermodulations, the method according to the invention proceeds as follows. In this connection, it is assumed, as an example, that the $M^{th}$ stage of an N-stage non-linear component produces an intermodulation.

Any two desired frequencies $f_{out1,s}$, $f_{out2,s}$ are selected from the output signal. Here again, it is advantageous if the selection of the output frequencies $f_{out1,s}$, $f_{out2,s}$ is made according to the related power, whereby the output frequencies $f_{out1,s}$ and $f_{out2,s}$ to be checked are first sorted according to their power. Subsequently, it is advantageous if the original input frequencies $f_{in1,b}$ and $f_{in2,b}$ are calculated.

In the next step, linear combinations of the output frequency $f_{zout,b}$ are calculated. For this, linear combinations are calculated for combinations of parameter pairs A, B, and C that can be predetermined, with A, B, C∈Z, whereby the value range of A, B, and C can be predetermined in each instance, according to $$f_{out,b}^{z} = \left| C \left| A \left| f_{in1,s} + \underbrace{\sum_{n=1}^{M} x(n) \cdot f_{LOn}}_{1} \right| \pm B \left| f_{in2,s} + \underbrace{\sum_{n=1}^{M} x(n) \cdot f_{LOn}}_{2} \right| + \underbrace{\sum_{n=M+1}^{N} x(n) \cdot f_{LOn}}_{3} \right| \right|$$

with
A, B, C: parameters that can be predetermined, with A, B∈Z,
$f_{in1,s}$: first input signal ahead of the component,
$f_{in2,s}$: second input signal ahead of the component,
$f_{LOn}$: oscillator frequency of the $n^{th}$ stage of the non-linear component,
N: number of stages of the non-linear component,
M: position of the non-linear component to be checked,
x(n): function that can be predetermined, with values +1 and −1, z: running variable of the calculated linear combination.

The input frequency $f_{in1,s}$ is pushed to the $M^{th}$ stage of the non-linear component with the term 1. Analogously, the input frequency $f_{in2,s}$ is pushed to the $M^{th}$ stage of the non-linear component with the term 2. The term 3 calculates the intermodulation of the $M^{th}$ stage of the non-linear component. With the last term, the intermodulation product is pushed to the $N^{th}$ stage (output) of the non-linear component, where the calculated signal $f_{out,b}$ is applied.

In a next step, a check is made as to whether the output signal $f_{out,b}$ calculated by means of linear combination corresponds to an actual output signal $f_{out,t}$ of the component, within a frequency range and power range that can be predetermined. If this case applies, then the output frequency $f_{out1,s}$, $f_{out2,s}$ selected from the output signal and assumed to be a spur is actually a spur and is eliminated from the output signal.

This check is carried out, in particular, for all the predetermined value pairs A, B, and all the output frequencies $f_{out}$ in the output signal of the component.

BRIEF DESCRIPTION OF THE DRAWINGS

Other objects and features of the present invention will become apparent from the following detailed description considered in connection with the accompanying drawing. It is to be understood, however, that the drawing is designed as an illustration only and not as a definition of the limits of the invention.

The sole FIGURE shows a spur chart diagram.

DETAILED DESCRIPTION OF THE PREFERRED EMBODIMENT

The parameters A and B can be derived, in particular, from the spur chart diagram shown in the Figure and which is known to a person skilled in the art. The spur chart shows a transfer of an input frequency $f_{in}$ to an output frequency, standardized for the oscillator frequency $f_{LO}$. In this connection, a straight line 1 having the gradient 1 stands for the desired transfer of $f_{in}$ to $f_{out}$. The exemplary illustration shows that an input signal $f_{in}/f_{LO}$=0.17, for example, is transferred to $f_{out}/f_{LO}$=1.17. At the same time, however, a spur is formed at $f_{out}/f_{LO}$=1.2 (straight line 2) and $f_{out}/f_{LO}$=1.3 (straight line 3).

The marked region B shows the frequency range that can be determined and is to be checked. In this connection, the size of the window can be predetermined, depending on the application case.

An advantage of the method according to the invention is that the false alarm rate is clearly reduced. In addition, the recognition of actual targets is increased, whereby the system is not unnecessarily burdened with the processing of artificially produced signals. Another advantage is that depending on the parameters A and B, as well as the frequency and power ranges to be checked, the method can be adapted to any desired receiver concepts.

Accordingly, while only a few embodiments of the present invention have been shown and described, it is obvious that many changes and modifications may be made thereunto without departing from the spirit and scope of the invention.

What is claimed is:

1. A method for enlarging an interference-free dynamic range of non-linear signal-processing components in receiver systems, in the conversion of input frequencies $f_{in}$ into output frequencies $f_{out}$, comprising:

calculating at least one linear combination of at least one input frequency $f_{in,t}$, $f_{in,b}$ and a fixed, predetermined oscillator $f_{LOn}$ of the components from an output signal of the component, for at least one output frequency $f_{out,s}$, $f_{out1,s}$, $f_{outs,2}$;

comparing said combination with any desired output frequency $f_{out,t}$ of the component;

recognizing an output frequency $f_{out,s}$, $f_{out1,s}$, $f_{outs,2}$ as a spur; and eliminating said output frequency recognized as a spur from the output signal of the component, if the calculated linear combination corresponds to any desired output frequency $f_{out,t}$ of the component, within a predetermined frequency and power range.

2. A method according to claim 1, wherein the output frequencies $f_{out,s}$, $f_{out1,s}$, $f_{outs,2}$ to be checked are sorted in the output signal according to their power, in ascending or descending order.

3. A method according to claim 1, wherein the linear combination that can be predetermined is a linear combination of mixer harmonics.

4. A method according to claim 2, wherein the original input frequency $f_{in,b}$ ahead of a signal-processing, non-linear component is calculated for each output frequency $f_{out,s}$ of the output signal to be checked.

5. A method according to claim 4, wherein linear combinations are calculated for the output frequency $f_{out,s}$ according to $$f^z_{out,s} = \left| A \cdot f_{in,b} + \sum_{n=1}^{N} B_n \cdot f_{LOn} \right|$$

with

A, $B_n$: parameters that can be predetermined, with A, $B_n \in Z$, $f_{in,b}$: input frequency ahead of the non-linear component, $f_{LOn}$: oscillator frequency of an $n^{th}$ stage of the non-linear component, N: number of stages, z: running variable of the calculated linear combination.

6. A method according to claim 2, wherein the linear combination that can be predetermined is a linear combination of intermodulations.

7. A method according to claim 6, wherein the output frequency $f_{out,b}$ is calculated with a linear combination according to $$f^z_{out,b} = \left| C \left| A \left| f_{in1,s} + \sum_{n=1}^{M} x(n) \cdot f_{LOn} \right| \pm B \left| f_{in2,s} + \sum_{n=1}^{M} x(n) \cdot f_{LOn} \right| \right| + \sum_{n=M+1}^{N} x(n) \cdot f_{LOn} \right|$$

with

A, B, C: parameters that can be predetermined, with A, $B \in Z$, $f_{in1,s}$: first input signal ahead of the component, $f_{in2,s}$: second input signal ahead of the component, $f_{LOn}$: oscillator frequency of an $n^{th}$ stage of the non-linear component, N: number of stages of the non-linear component, M: position of the non-linear component to be checked, x(n): function that can be predetermined, with values +1 and −1, z: running variable of the calculated linear combination.

* * * * *